United States Patent
Vida

[15] 3,683,083
[45] Aug. 8, 1972

[54] ANALGETIC COMPOSITION AND METHOD EMPLOYING 1-MORPHOLINOMETHYL-5-ETHYL-5-PHENYL BABITURIC ACID

[72] Inventor: Julius A. Vida, Boston, Mass.
[73] Assignee: The Kendall Company, Walpole, Mass.
[22] Filed: Nov. 9, 1970
[21] Appl. No.: 88,195

[52] U.S. Cl. .................................... 424/248
[51] Int. Cl. ................................... A61k 27/00
[58] Field of Search .......................... 424/248

[56] References Cited

OTHER PUBLICATIONS

Chem. Abst. 68 – 105144g (1968)

*Primary Examiner*—Stanley J. Friedman
*Attorney*—Ellen P. Trevors and Robert D. Chodera

[57] ABSTRACT

The use of 1-morpholinomethyl-5-ethyl-5-phenyl barbituric acid as an analgetic agent is described.

2 Claims, No Drawings

ANALGETIC COMPOSITION AND METHOD EMPLOYING 1-MORPHOLINOMETHYL-5-ETHYL-5-PHENYL BABITURIC ACID

This invention relates to the use of 1-morpholinomethyl-5-ethyl-5-phenyl barbituric acid as an analgetic for treating symptoms of pain in warm-blooded animals, and to therapeutic compositions containing this compound.

1-Morpholinomethyl-5-ethyl-5-phenyl barbituric acid has been previously reported in the literature. Thus, L. Rylski et al., Acta Pol. Pharm. 24 (4): 366–70 (1967) disclose the preparation of this compound, but do not indicate specific therapeutic uses therefor.

Now it has been found in accordance with this invention that 1-morpholinomethyl-5-ethyl-5-phenyl barbituric acid is an effective analgetic agent for alleviating symptoms of pain in warm-blooded animals.

This compound is readily provided by reacting 5-ethyl-5-phenyl barbituric acid, which is generally referred to as phenobarbital, with morpholine, hydrochloric acid and formaldehyde, or aqueous solutions of formaldehyde, as described in the aforementioned L. Rylski et al. reference.

The analgetic of this invention can be formulated with conventional physiologically acceptable vehicles and carriers to make syrups, isotonic solutions, tablets and other dosage forms. Effectiveness and toxicity of this compound is such that each dosage unit can contain from 5 to 500mg of active material.

All tests were conducted on adult albino male mice (Charges River strain); the dosage consisted of the active agent suspended in 10 percent aqueous acacia and was administered orally unless otherwise indicated.

Acute oral toxicity and acute intraperitoneal toxicity were determined in the conventional manner. The results were expressed as $LD_{50}$, the dose required to produce death in 50 percent of the animals treated, determined graphically, with the 95 percent limits shown in parentheses.

Two established procedures were employed to determine analgetic activity. The method described by Eddy, N.B., and Leimbach, D., J. Pharmacol. Exptl. Therap. 107: 385 (1953) was followed, with the following modifications, in the first procedure. Mice are pretested by placing them individually on the cleaned surface of a copper water bath, the temperature of which is maintained at 54°–55° C. The reaction time to this noxious thermal stimulus is the time in seconds required for either licking of the paws or jumping, such that all four paws leave the surface of the plate. The drug is then administered orally or subcutaneously, generally at 5 dosage levels, (10 mice per dosage level) and the reaction times are redetermined at intervals of one-half hour, 1 hour, and 2 hours; the time of peak activity is the time at which the greatest number of animals is protected. From the pretreatment reaction times the mean and standard deviations are computed. The cut-off time is taken to be the mean reaction time plus 2 standard deviation units. Reaction times equal to or exceeding this cut-off time are considered to represent analgetic responses. The dosage required to produce an analgetic response in 50 percent of the animals ($ED_{50}$ and 95 percent limits) is computed graphically.

In the second procedure, the method of Siegmund, E., et. al. reported in Proc. Soc. Exptl. Biol. and Med. 95: 729, (1957) was generally followed. The method is based on the antagonism by both non-narcotic and narcotic analgetics of a syndrome induced in mice following intraperitoneal injection of phenylparaquinone. The syndrome is characterized by intermittent contractions of the abdomen, twisting and turning of the trunk, and extension of the hind legs, beginning 3 to 10 minutes after the injection and persisting for more than 1 hour. The test drug is administered orally at 4 to 5 dosage levels. At the time of peak activity, 0.25ml of a 0.02 percent solution of phenylparaquinone in 5 percent (aqueous) ethyl alcohol is injected intraperitoneally. Inhibition of the syndrome is considered an analgetic response. The dosage required for this effect in 50 percent of the mice ($ED_{50}$) is computed graphically.

The following example will serve to illustrate the practice of this invention.

EXAMPLE

Following the procedure disclosed by L. Rylski et al. in Acta Pol. Pharm. 24 (4): 369–73 (1967), 23.0g. of 5-ethyl-5-phenyl barbituric acid was added to the solution of 8.7ml of morpholine and 8.0ml of 37 percent aqueous formaldehyde in 50ml absolute ethanol. After heating at reflux for 30 minutes, the reaction mixture was allowed to cool to room temperature, and then refrigerated overnight. Filtration, followed by washing with ethanol, provided 32g. of 1-morpholinomethyl-5-ethyl-5-phenyl barbituric acid, m.p. 73° C.

Pharmacological testing of this compound gave the following results:

| | Dosage, mg/kg |
|---|---|
| Acute Toxicity | |
| $LD_{50}$ (oral) | >250, <500 |
| Analgetic Activity | |
| Hot-Plate $ED_{50}$ (subcutaneous) | 36(27.1–47.9) |
| Hot-Plate $ED_{40}$ (oral) (A non-linear dosage response curve was obtained.) | 3.125 |
| Phenyl-p-quinone Writhing $ED_{50}$ (oral) | 50 |
| Time of Peak Activity | 1 hour |

What is claimed is:

1. A method of treating symptoms of pain in a warm-blooded animal which comprises administering to said animal an analgetically effective amount of 1-morpholinomethyl-5-ethyl-5-phenyl barbituric acid.

2. A therapeutic composition for treatment of symptoms of pain in a warm-blooded animal comprising a physiologically acceptable carrier and an analgetically effective amount of 1-morpholinomethyl-5-ethyl-5-phenyl barbituric acid.

* * * * *